April 28, 1931.  O. J. BUCHHOLZ  1,802,871
WIRE WORKING TOOL
Filed March 1, 1930    2 Sheets-Sheet 1
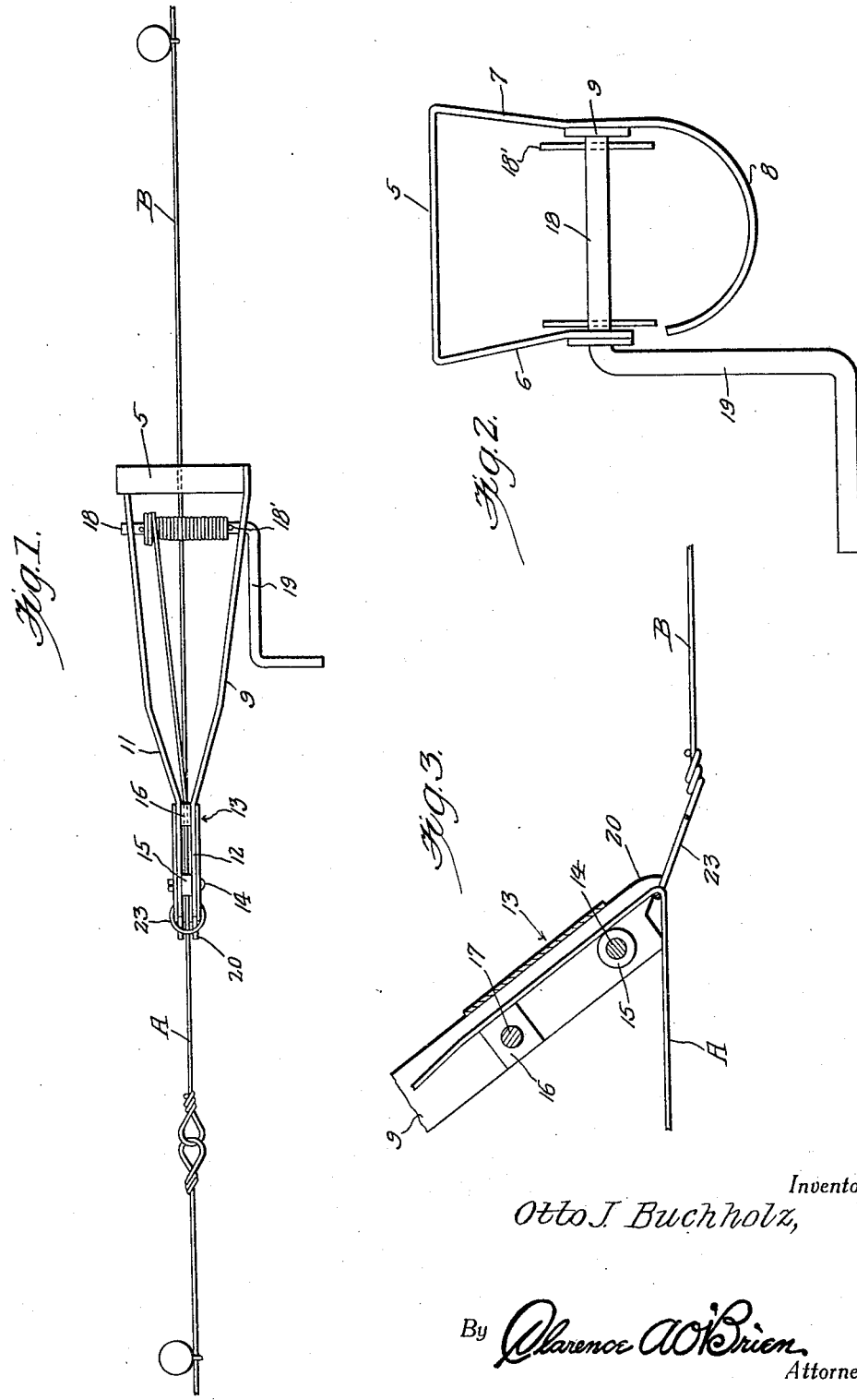
Inventor
Otto J. Buchholz,
By Clarence A. O'Brien
Attorney April 28, 1931.  O. J. BUCHHOLZ  1,802,871
WIRE WORKING TOOL
Filed March 1, 1930  2 Sheets-Sheet 2
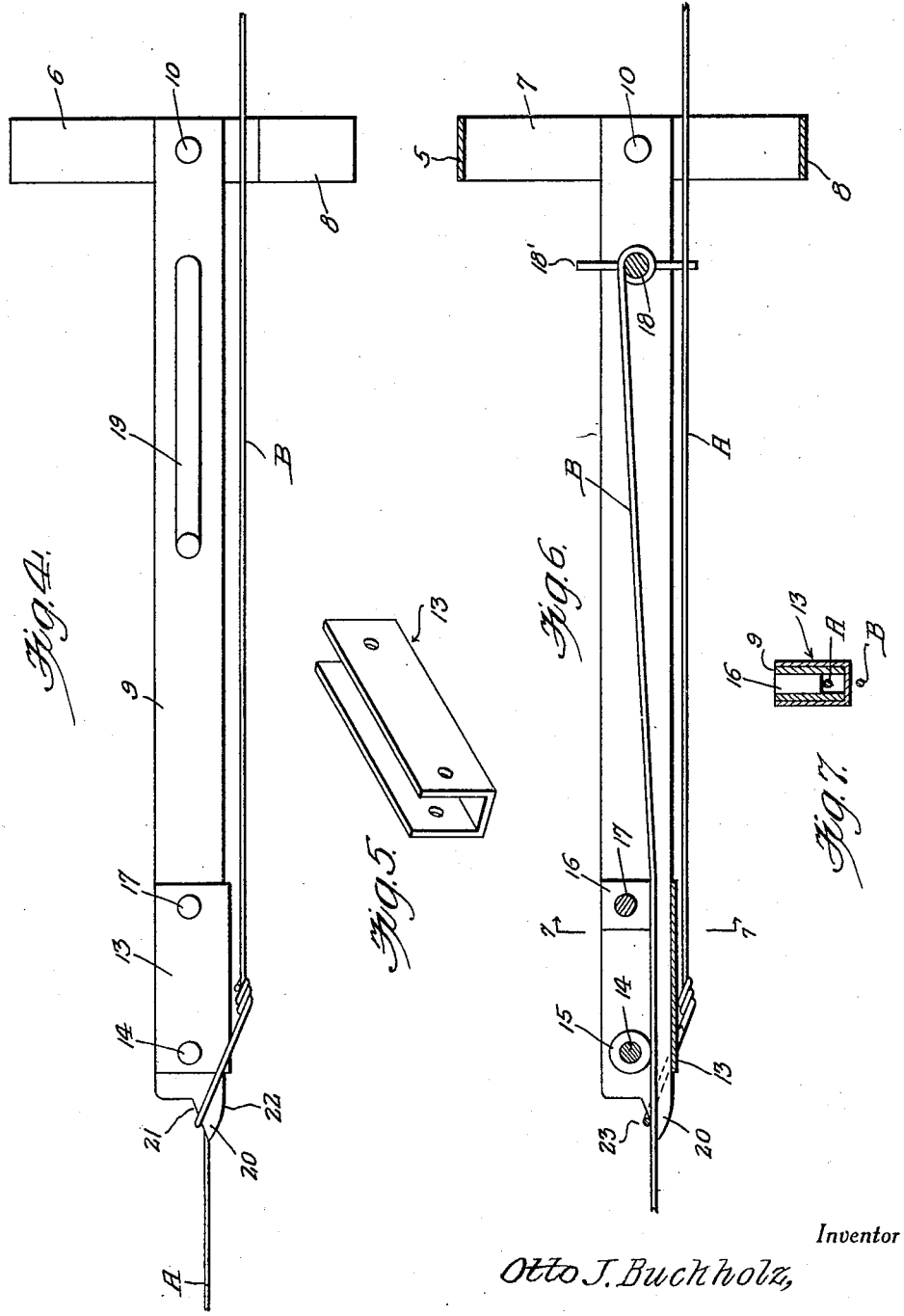
Inventor
*Otto J. Buchholz,*
By *Clarence A. O'Brien,*
Attorney Patented Apr. 28, 1931

1,802,871

UNITED STATES PATENT OFFICE

OTTO J. BUCHHOLZ, OF LINDSAY, MONTANA, ASSIGNOR OF ONE-HALF TO JOSEPH E. STORMS, OF GLENDIVE, MONTANA

WIREWORKING TOOL

Application filed March 1, 1930. Serial No. 432,447.

This invention relates broadly to wire working tools and has more particular reference to a tool used for stretching and splicing wire, and has as its primary object a simple, inexpensive and practical tool of this character whereby any type of wire used for fences and the like may readily and effectively be stretched and held to any desired tension until the ends of the wire have been permanently connected.

A still further object of the invention is to provide a tool of this character including a suitable handle whereby the device may be easily held by the operator during its use.

Other objects and advantages of the invention will become apparent during a study of the following description, taken in connection with the accompanying drawings, wherein:

Figure 1 is a top plan view of the tool,

Figure 2 is an end view of the tool,

Figure 3 is a fragmentary detail sectional view taken through the forward end of the tool and showing the manner of officially securing the ends of the wires to be secured together to the tool, Figure 4 is a side elevational view thereof, Figure 5 is a perspective view of a combined guide and clamping plate, Figure 6 is a longitudinal sectional view taken through the tool, Figure 7 is a vertical transverse sectional view taken substantially on line 7—7 of Figure 6.

With reference more in detail to the drawings, it will be seen that my improved tool comprises an inverted U-shaped handle 5 having the converging legs 6 and 7, the leg 7 being of a greater length than the leg 6 and at its free end curving inwardly as at 8 to terminate in spaced relation with the free end of the leg 6. Two side members 9—9 are secured at one end to the legs 6 and 7 respectively, one of the side members 9 being secured to the leg 6 adjacent the free end of the leg, and the other of the members 9 being secured to the leg 7 intermediate the ends of the leg 7 in transverse alinement with the first mentioned member 9.

The side members 9 are secured to the respective legs through the medium of rivets 10. The forward ends of the members 9 are curved slightly inwardly as at 11 to merge into spaced parallel extensions 12. The parallel extensions 12 are received between the vertical flanges of a U-shape or channel plate 13 as clearly suggested in Figure 1.

A bolt 14 passes through openings in the forward ends of the flanges of the channel plate 13 and through the spaced parallel extensions 12, and a roller 15 is mounted on the bolt between said extensions 12. A spacer block 16 is disposed between the parallel extensions 12 rearwardly of the roller 15 and is maintained in place in spaced relation to the bottom of the channel plate 13 through the medium of a rivet 17 passing through the rear ends of the flanges of said plate 13 and said parallel extensions as clearly suggested in Figure 2.

Near the handle 5 the side members 9 are provided with alined openings constituting bearings for a shaft 18, which shaft 18 is also provided with a crank or handle 19. Adjacent each end of the shaft inwardly of the members 9 there extends transversely through the shaft, pins 18'.

The parallel extensions 12 of the arms 9 at their forward ends are provided with forwardly extending projections or lugs 20. Each of the lugs 20 has an upper forwardly and downwardly inclined face 21 and a lower upwardly and forwardly curved face 22 merging into the lower end of the upper inclined face 21 so that the lugs 20 are somewhat in the nature of hooks.

In Figure 1 I have designated the ends of the wire to be spliced by the reference characters A and B respectively. In the operation of the device the first step is to provide on the end of one of the wires, the wire B for example, a loop 23. The hook forming lugs 20 are then engaged with the loop 23 in the manner suggested in Figure 3, at the same time pass the wire B through the intervening space between the confronting end of the legs 6 and 7 of handle 5.

Next the wire A is passed through the loop 23 between the parallel extensions 12 below the roller 15 and spacer block 16 and continued rearwardly, and the free end of the wire A is then secured to one of the pins 18' by twisting the end of the wire A about a portion of the pin in a well known manner.

By operating the handle 19 the shaft 18 is then rotated in the proper direction for winding the wire A upon the shaft 18 between the pins 18'.

To make the desired splice, the wire B is again passed through the space between the end of the curved portion 8 and the leg 6 and the entire device is then swung to a substantial vertical position, and the handle having been held firmly it is apparent that no slack has taken place.

Now, the handle 19 may be rotated in a reverse direction; the wire A then, being cut adjacent the shaft 18, is wrapped around the other wire B as is manifest.

It is thought that from the foregoing description, taken in connection with the accompanying drawings, a clear understanding of the operation, construction, utility and advantages of this invention will be had by those skilled in the art without a more detailed description.

Even though I have herein shown and described the preferred embodiment of my invention, it is to be understood that the same is susceptible to changes as comprehended by the spirit of the invention as herein described, and the scope of the appended claims.

Having thus described my invention, what I claim as new is:

1. In a wire working tool, a U-shaped handle, side members secured at one end to the legs of said U-shaped handle and extending at right angles thereto, a channel plate receiving the free ends of said side members, transversely alined lugs extending forwardly from the free ends of said side members and projecting beyond the adjacent end of said channel plate, and wire reeling means carried by the side members adjacent said handle.

2. In a wire working tool, a U-shaped handle, side members secured at one end to the legs of said U-shaped handle and extending at right angles thereto, a channel plate receiving the free ends of said side members, transversely alined lugs extending forwardly from the free ends of said side members and projecting beyond the adjacent end of said channel plate, and wire reeling means carried by the side members adjacent said handle, one leg of said handle being longer than the other leg and terminating in a curved end portion, the free end of which is disposed in spaced relation with the free end of the other leg of said handle.

3. In a wire working tool, a U-shaped handle, side members secured at one end to the legs of said U-shaped handle and extending at right angles thereto, a channel plate receiving the free ends of said side members, transversely alined lugs extending forwardly from the free ends of said side members and projecting beyond the adjacent end of said channel plate, wire reeling means carried by the side members adjacent said handle, one leg of said handle being longer than the other leg and terminating in a curved end portion, the free end of which is disposed in spaced relation with the free end of the other leg of said handle, a roller between the forward ends of said side members rearwardly of said lugs, and a spacer block between said ends of said side member rearwardly of said roller, said roller and spacer block respectively being disposed above the bottom wall of said channel plate.

4. In a wire working tool of the class described, a substantially U-shaped handle, the legs of which vary in length, the longer leg merging into a curved end portion terminating in spaced relation to the free end of the shorter leg, a pair of side members secured at one end to the legs of the handle at right angles to the handle, said side members at their free ends curving inwardly toward one another, a channel plate adapted to receive the free ends of said side members, forwardly extending lugs on the last-mentioned ends of said side members, said lugs having upper downwardly and forwardly inclined faces, a shaft journalled between said side members adjacent said handle, a crank on the shaft, pins extending transversely through the shaft inwardly from the ends of the shaft.

5. A wire working tool including in combination, a handle, a pair of spaced apart side members extending at right angles to said handle, a plate engaging said side members remote from said handle normally retaining the free ends of said side members inwardly toward one another, substantially hook-shaped lugs on the free ends of said side members forwardly of said plates, and a wire reeling member mounted between said side members remote from said plate.

In testimony whereof I affix my signature.

OTTO J. BUCHHOLZ.